US012209502B1

(12) United States Patent
Heeter et al.

(10) Patent No.: US 12,209,502 B1
(45) Date of Patent: Jan. 28, 2025

(54) ACTIVE FAN TIP TREATMENT USING ROTATING DRUM ARRAY WITH AXIAL CHANNELS IN FAN TRACK LINER FOR DISTORTION TOLERANCE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/758,996

(22) Filed: Jun. 28, 2024

(51) Int. Cl.
*F04D 29/68* (2006.01)
*F01D 11/08* (2006.01)
*F01D 11/22* (2006.01)
*F04D 29/52* (2006.01)

(52) U.S. Cl.
CPC .............. *F01D 11/22* (2013.01); *F01D 11/08* (2013.01); *F04D 29/526* (2013.01); *F04D 29/685* (2013.01); *F05D 2220/36* (2013.01); *F05D 2250/75* (2013.01); *F05D 2270/101* (2013.01)

(58) Field of Classification Search
CPC ...... F04D 29/685; F04D 29/526; F01D 11/08; F01D 11/22
See application file for complete search history.

(56) References Cited

U.S. PATENT DOCUMENTS

| | | | |
|---|---|---|---|
| 4,086,022 | A | 4/1978 | Freeman et al. |
| 4,155,680 | A | 5/1979 | Lii et al. |
| 4,239,452 | A | 12/1980 | Frank, Jr. |
| 5,137,419 | A | 8/1992 | Waterman |
| 5,308,225 | A | 5/1994 | Koff et al. |
| 5,474,417 | A | 12/1995 | Privett et al. |
| 5,762,470 | A | 6/1998 | Gelmedov et al. |
| 6,231,301 | B1 | 5/2001 | Barnett et al. |
| 6,406,470 | B1 | 6/2002 | Kierce |
| 6,497,551 | B1 | 12/2002 | Hand et al. |
| 6,514,039 | B1 | 2/2003 | Hand |
| 6,619,909 | B2 | 9/2003 | Barnett et al. |
| 6,648,591 | B2 | 11/2003 | Collins |
| 6,685,426 | B2 | 2/2004 | Clark |

(Continued)

FOREIGN PATENT DOCUMENTS

| | | |
|---|---|---|
| CN | 201152282 Y | 11/2008 |
| CN | 104373388 B | 1/2017 |

(Continued)

*Primary Examiner* — Woody A Lee, Jr.
*Assistant Examiner* — Behnoush Haghighian
(74) *Attorney, Agent, or Firm* — Barnes & Thornburg LLP

(57) ABSTRACT

A gas turbine engine includes a fan and a fan case assembly. The fan includes a fan rotor configured to rotate about an axis of the gas turbine engine and a plurality of fan blades coupled to the fan rotor for rotation therewith. The fan case assembly extends circumferentially around the plurality of fan blades radially outward of the plurality of the fan blades.

20 Claims, 12 Drawing Sheets

(56) References Cited

U.S. PATENT DOCUMENTS

| | | | | |
|---|---|---|---|---|
| 6,736,594 | B2 * | 5/2004 | Irie | F04D 29/547 415/173.1 |
| 6,742,983 | B2 | 6/2004 | Schmuecker | |
| 6,832,890 | B2 | 12/2004 | Booth | |
| 6,905,305 | B2 | 6/2005 | James | |
| 6,935,833 | B2 | 8/2005 | Seitz | |
| 7,077,623 | B2 | 7/2006 | Guemmer | |
| 7,186,072 | B2 | 3/2007 | Seitz | |
| 7,210,905 | B2 | 5/2007 | Lapworth | |
| 7,575,412 | B2 | 8/2009 | Seitz | |
| 7,967,556 | B2 | 6/2011 | Volker | |
| 8,043,046 | B2 | 10/2011 | Guemmer | |
| 8,152,444 | B2 | 4/2012 | Guemmer | |
| 8,152,445 | B2 | 4/2012 | Guemmer | |
| 8,152,467 | B2 | 4/2012 | Guemmer | |
| 8,182,209 | B2 | 5/2012 | Brault et al. | |
| 8,192,148 | B2 | 6/2012 | Guemmer | |
| 8,257,022 | B2 | 9/2012 | Guemmer | |
| 8,262,340 | B2 | 9/2012 | Guemmer | |
| 8,337,146 | B2 | 12/2012 | Yu | |
| 8,403,630 | B2 | 3/2013 | Guemmer | |
| 8,419,355 | B2 | 4/2013 | Guemmer et al. | |
| 8,602,720 | B2 | 12/2013 | Goswami et al. | |
| 8,845,269 | B2 | 9/2014 | Agneray et al. | |
| 8,915,699 | B2 | 12/2014 | Brignole et al. | |
| 9,638,213 | B2 | 5/2017 | Obrecht et al. | |
| 9,651,060 | B2 | 5/2017 | Morel et al. | |
| 9,816,528 | B2 | 11/2017 | Johann | |
| 9,957,976 | B2 | 5/2018 | Allford | |
| 10,024,336 | B2 | 7/2018 | Obrecht et al. | |
| 10,047,620 | B2 | 8/2018 | Giacchéet al. | |
| 10,066,640 | B2 | 9/2018 | Bennington et al. | |
| 10,378,550 | B2 * | 8/2019 | Lim | F04D 29/685 |
| 10,450,869 | B2 | 10/2019 | Brignole et al. | |
| 10,539,154 | B2 | 1/2020 | Mallina et al. | |
| 10,914,318 | B2 | 2/2021 | Capozzi et al. | |
| 11,078,805 | B2 | 8/2021 | Joly et al. | |
| 11,092,030 | B2 * | 8/2021 | Joly | F04D 29/685 |
| 11,131,322 | B2 | 9/2021 | Grothe et al. | |
| 11,473,438 | B2 | 10/2022 | Reynolds et al. | |
| 11,572,897 | B1 * | 2/2023 | Duong | F04D 27/0246 |
| 11,686,207 | B2 | 6/2023 | Brignole et al. | |
| 11,702,945 | B2 | 7/2023 | Heeter et al. | |
| 11,732,612 | B2 | 8/2023 | Molnar, Jr. et al. | |
| 2003/0002982 | A1 * | 1/2003 | Irie | F04D 15/0027 415/220 |
| 2005/0226717 | A1 | 10/2005 | Xu | |
| 2007/0147989 | A1 | 6/2007 | Collins | |
| 2008/0044273 | A1 | 2/2008 | Khalid | |
| 2009/0065064 | A1 | 3/2009 | Morris et al. | |
| 2010/0310353 | A1 | 12/2010 | Yu | |
| 2012/0269619 | A1 | 10/2012 | Johann | |
| 2012/0315131 | A1 * | 12/2012 | Mertens | F04D 27/0215 415/126 |
| 2014/0119883 | A1 | 5/2014 | Kempf | |
| 2015/0086344 | A1 | 3/2015 | Guemmer | |
| 2016/0010652 | A1 * | 1/2016 | Lim | F04D 27/002 415/128 |
| 2016/0230776 | A1 | 8/2016 | Bennington et al. | |
| 2018/0163562 | A1 | 6/2018 | Khare et al. | |
| 2020/0224675 | A1 | 7/2020 | Capozzi et al. | |
| 2020/0332673 | A1 * | 10/2020 | Joly | F01D 9/047 |

FOREIGN PATENT DOCUMENTS

| | | | |
|---|---|---|---|
| CN | 110242616 | A | 9/2019 |
| CN | 113217469 | A | 8/2021 |
| DE | 60201109 | T2 | 10/2004 |
| DE | 102007056953 | A1 | 5/2009 |
| DE | 102011007767 | A1 | 10/2012 |
| DE | 102013210169 | A1 | 12/2014 |
| DE | 102018203304 | A1 | 9/2019 |
| EP | 2268926 | B1 | 8/2011 |
| EP | 2434164 | | 3/2012 |
| EP | 2434164 | A1 | 3/2012 |
| EP | 3081779 | | 10/2016 |
| EP | 3081779 | A1 | 10/2016 |
| EP | 3591237 | A1 | 1/2020 |
| EP | 3006679 | B1 | 9/2023 |
| FR | 3122450 | A1 | 11/2022 |
| GB | 2408546 | A | 6/2005 |
| GB | 2477745 | A | 8/2011 |
| JP | 2003227497 | A | 8/2003 |
| KR | 200930757 | A | 3/2009 |
| KR | 1025867 | B1 | 3/2011 |
| KR | 1387391 | B1 | 4/2014 |
| WO | 2014098276 | A1 | 6/2014 |
| WO | 2022229555 | A2 | 11/2022 |

* cited by examiner

ACTIVE FAN TIP TREATMENT USING ROTATING DRUM ARRAY WITH AXIAL CHANNELS IN FAN TRACK LINER FOR DISTORTION TOLERANCE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly is adapted for use with a gas turbine engine. The fan case assembly comprises a case, a plurality of drums, and a control unit.

The case extends circumferentially at least partway about a central axis of the fan case assembly to define an outer boundary of a gas path of the gas turbine engine. A plurality of grooves extend axially at least partway between an axially forward end of the fan case and an axially aft end of the fan case.

Each one of the plurality of drums is disposed in a corresponding one of the plurality of grooves of the fan case and spaced circumferentially about the central axis. Each drum of the plurality of drums includes a forward portion and an aft portion rotatably connected to the forward portion. The forward portion and aft portion are each shaped to form a respective axial passageway.

The forward portion and the aft portion of each drum of the plurality of drums are configured to rotate about a respective drum axis between a closed position and an open position. In the closed position, the forward portion and the aft portion are positioned to block fluid communication between the forward axial passageway and the aft axial passageway. In the open position, the forward portion and the aft portion are positioned to allow fluid communication between the forward axial passageway and the aft axial passageway.

The control unit is configured to rotate the plurality of drums about the respective drum axis between the closed position and the open position in response to preselected operating conditions to minimize negative effects pressure and swirl distortions in the gas turbine engine to improve stall margin.

In some embodiments, the forward axial passageway extends axially along the drum axis of the forward portion from near a forward end surface of the forward portion through an aft end surface of the forward portion to create an aft end opening of the forward axial passageway.

In some embodiments, the aft axial passageway extends axially along the drum axis of the aft portion from near an aft end surface of the forward portion through a forward end surface of the aft portion to create a forward end opening of the aft axial passageway.

In some embodiments, in the open position, the forward end opening of the aft axial passageway and the aft end opening of the forward axial passageway align to allow fluid communication between the forward axial passageway and the aft axial passageway.

In some embodiments, in the closed position, the forward end opening of the aft axial passageway and the aft end opening of the forward axial passageway are positioned to block fluid communication between the forward axial passageway and the aft axial passageway.

In some embodiments, the forward portion is shaped to form a forward aperture in an outer surface of the drum. The forward aperture is disposed near a forward end of the drum and in fluid communication with the forward axial passageway.

In some embodiments, the aft portion is shaped to form an aft aperture in an outer surface of the drum. The aft aperture is disposed near an aft end of the drum and in fluid communication with the aft axial passageway.

In some embodiments, in the open position, each of the plurality of drums is positioned to face the forward aperture and the aft aperture towards the gas path to allow fluid communication between the gas path, the forward aperture, the forward axial passageway, the aft axial passageway, and the aft aperture.

In some embodiments, the case includes a circumferential channel. The plurality of grooves intersect the circumferential channel.

In some embodiments, the plurality of drums includes a first drum in a first groove and a second drum in a second groove. A portion of the circumferential channel extends between the first drum and the second drum.

In some embodiments, at least one of the forward portion and the aft portion is shaped to form a T shaped passageway disposed near an end of the drum in fluid communication with the respective axial passageway.

In some embodiments, in the open position, a first portion of the T shaped passageway is aligned with the circumferential channel. A second portion of the T shaped passageway faces radially towards the gas path to allow fluid communication between the gas path and the T shaped passageway.

In some embodiments, in a bypass position, a first portion of the T shaped passageway is aligned with the circumferential channel on both sides of the corresponding drum and a second portion of the T shaped passageway faces radially away from the gas path to block fluid communication between the T shaped passageway and the gas path.

In some embodiments, a gas turbine engine comprises a fan and a fan case assembly. The fan includes a fan rotor configured to rotate about an axis of the gas turbine engine and a plurality of fan blades coupled to the fan rotor for rotation therewith. The fan case assembly is adapted for use with the gas turbine engine. The fan case assembly comprises a case, a plurality of drums, and a control unit.

The case extends circumferentially at least partway about a central axis of the fan case assembly to define an outer boundary of a gas path of the gas turbine engine. A plurality of grooves extend axially at least partway between an axially forward end of the fan case and an axially aft end of the fan case.

Each one of the plurality of drums is disposed in a corresponding one of the plurality of grooves of the fan case and spaced circumferentially about the central axis. Each drum of the plurality of drums includes a forward portion and an aft portion rotatably connected to the forward portion. The forward portion and aft portion are each shaped to form a respective axial passageway.

The forward portion and the aft portion of each drum of the plurality of drums are configured to rotate about a respective drum axis between a closed position and an open position. In the closed position, the forward portion and aft portion are positioned to block fluid communication between the forward axial passageway and the aft axial passageway. In the open position, the forward portion and aft portion are positioned to allow fluid communication between the forward axial passageway and the aft axial passageway.

The control unit is configured to rotate the plurality of drums about the respective drum axis between the closed position and the open position in response to preselected operating conditions to minimize negative effects pressure and swirl distortions in the gas turbine engine to improve stall margin.

In some embodiments, a respective bell crank is disposed near a forward end and an aft end of each one of the plurality of drums. The bell crank at the forward end is mechanically coupled with the forward portion. The bell crank at the aft end is mechanically coupled to the aft portion.

In some embodiments, a respective pinion is disposed near a forward end and an aft end of each one of the plurality of drums. The pinion at the forward end is engaged with a rack disposed on the forward portion. The pinion at the aft end is engaged with a rack disposed on the aft portion.

In some embodiments, a respective gear is disposed near a forward end and an aft end of each one of the plurality of drums. The gear at the forward end is engaged with the forward portion. The gear at the aft end is engaged with the aft portion. A respective motor is coupled to each one of the gears.

In some embodiments, a respective motor is disposed at a forward end and an aft end of each one of the plurality of drums. The motor at the forward end is configured to rotate the forward portion. The motor at the aft end is configured to rotate the aft portion.

In some embodiments, the respective forward portion and the aft portion are independently controlled.

In some embodiments, a method comprises providing a fan case assembly adapted for use with a gas turbine engine. The fan case assembly includes a case and a plurality of drums. The case extends circumferentially at least partway about a central axis of the gas turbine engine and is formed to define an outer boundary of a gas path of the gas turbine engine. The case is formed to define a circumferential channel that extends at least partway about the central axis.

The plurality of drums are arranged in axial grooves intersecting the circumferential channel. Each drum of the plurality of drums include a forward portion and an aft portion rotatably connected to the forward portion. The forward portion and aft portion each shaped to form a respective axial passageway. Each drum of the plurality of drums is configured to rotate about a respective drum axis.

In some embodiments, the method includes locating the plurality of drums in a closed position in which the forward portion and aft portion are positioned to block fluid communication between the forward axial passageway and the aft axial passageway.

In some embodiments, the method includes rotating the plurality of drums to an open position in which the forward portion and aft portion are positioned to allow fluid communication between the forward axial passageway and the aft axial passageway.

These and other features of the present disclosure will become more apparent from the following description of the illustrative embodiments.

DETAILED DESCRIPTION OF THE DRAWINGS

Figure 1:
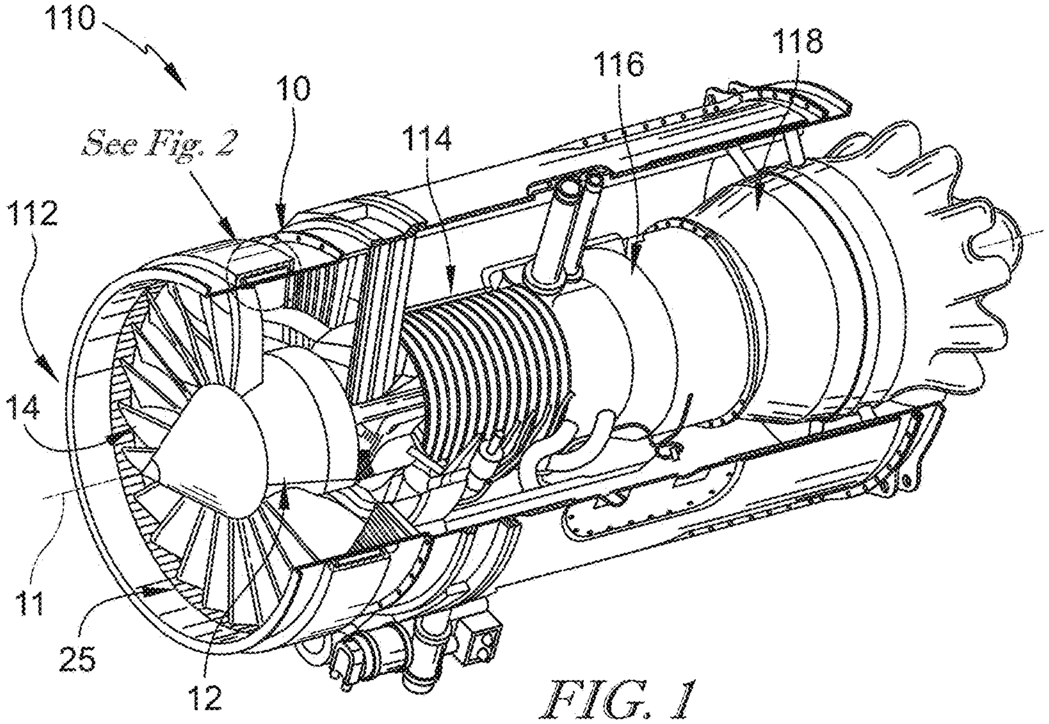
FIG. 1 is a cutaway view of a gas turbine engine.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112.

In some embodiments, the fan 112 includes a fan rotor 12 and a fan case assembly 10 as shown in FIG. 1. The fan rotor 12 is configured to rotate about an axis 11 of the gas turbine engine 110, and a plurality of fan blades 14 with a leading edge 16 and a trailing edge 18 are coupled to the fan rotor for rotation therewith. The fan case assembly 10 extends circumferentially around the fan blades 14 of the fan rotor 12 such that the fan case assembly 10 is aligned axially with the fan blades 14.

Figure 2:
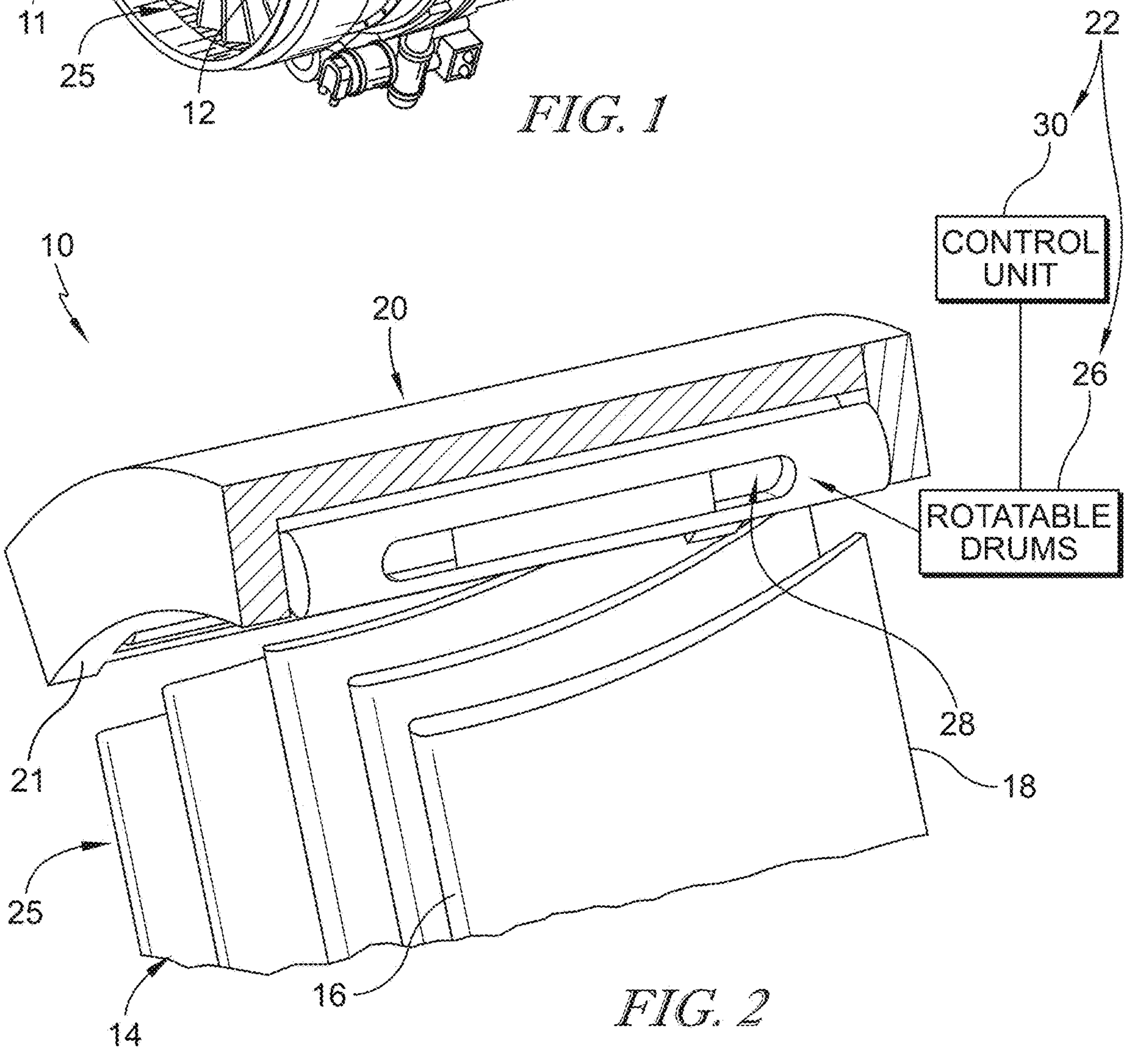
FIG. 2 is a detail view of the fan case assembly included in the gas turbine engine of FIG. 1.
Figure 3:
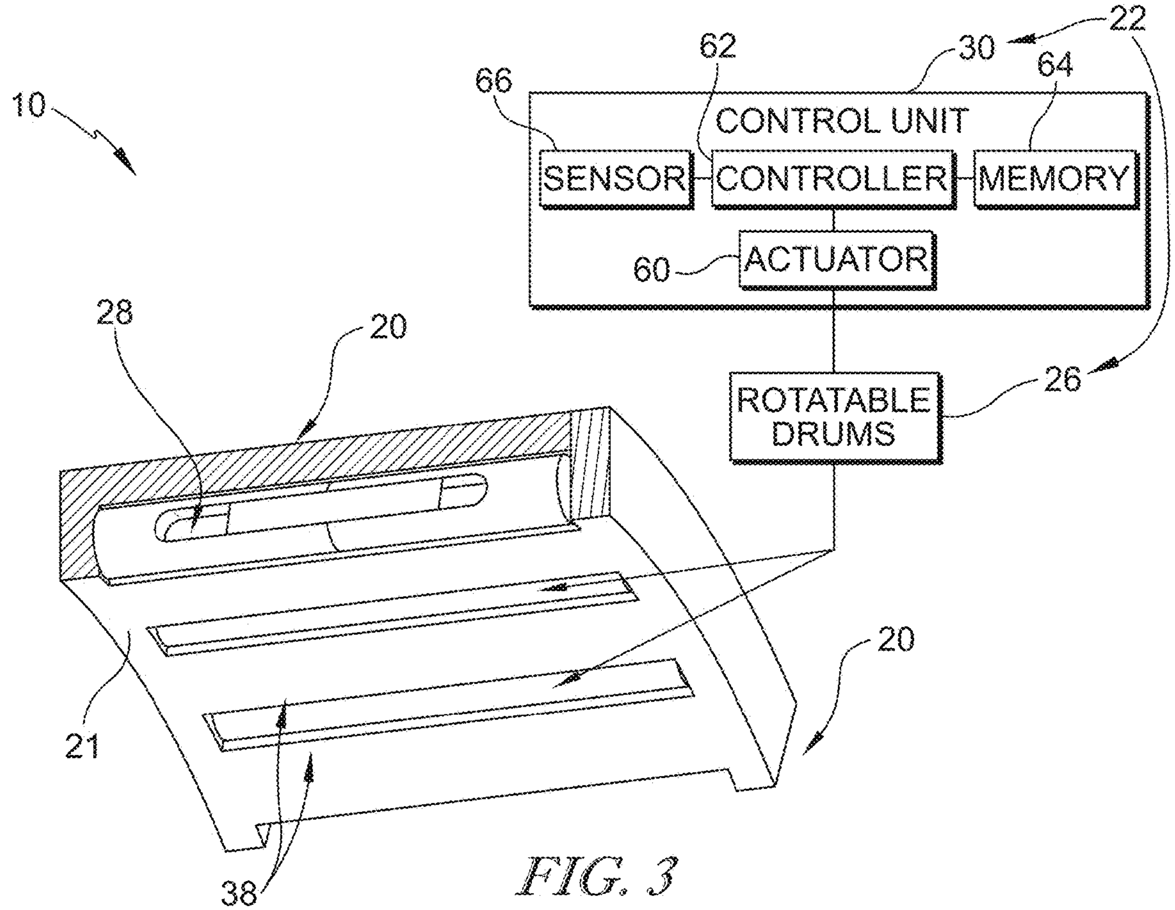
FIG. 3 is a perspective view of the fan case assembly of FIG. 2.
Figure 4:
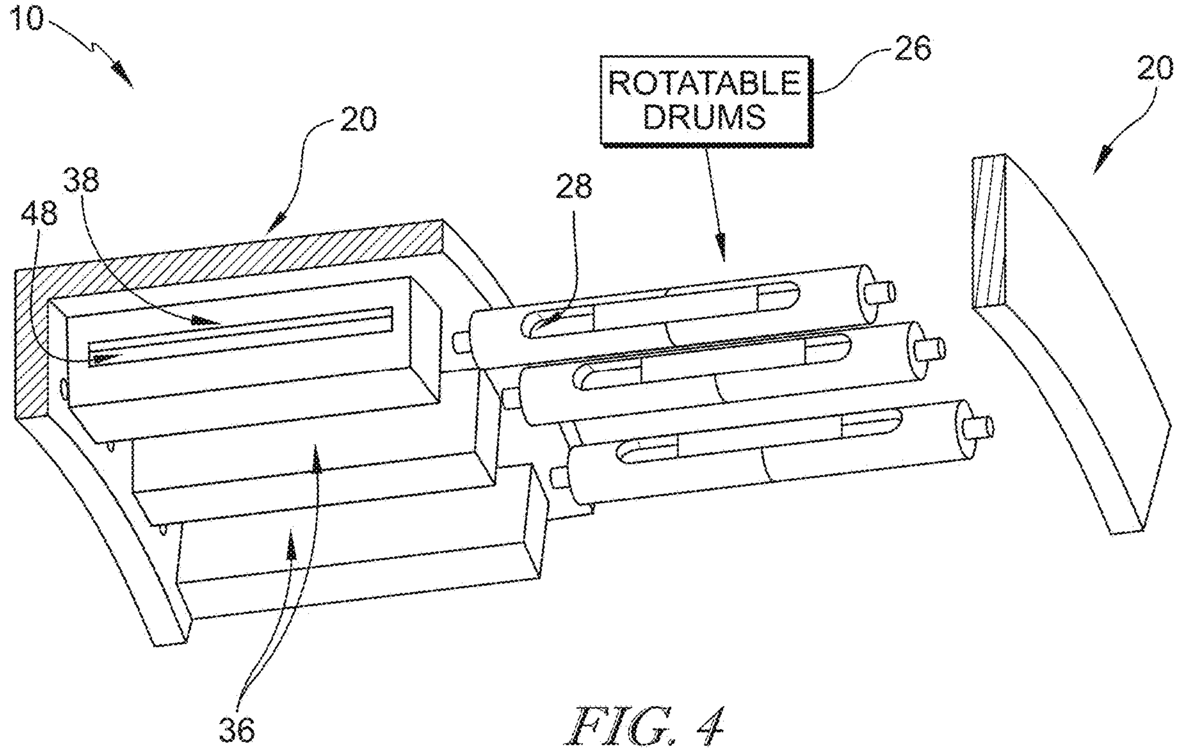
FIG. 4 is an exploded view of the fan case assembly of FIG. 3.

The fan case assembly 10 includes, among other components, a case 20 and an inlet distortion mitigation system 22 as shown in FIGS. 2-4. The fan case assembly 10 is adapted for use with a gas turbine engine 110 as shown in FIG. 1. The fan case assembly 10 comprises a case 20. The case 20 extends circumferentially at least partway about a central axis 11 of the fan case assembly 10. The case 20 defines an outer boundary 21 of a gas path 25 of the gas turbine engine 110. The case 20 is formed to define a plurality of grooves 36. The grooves 36 extend axially at least partway between an axially forward end of the fan case 20 and an axially aft end of the fan case 20.

Figure 8:
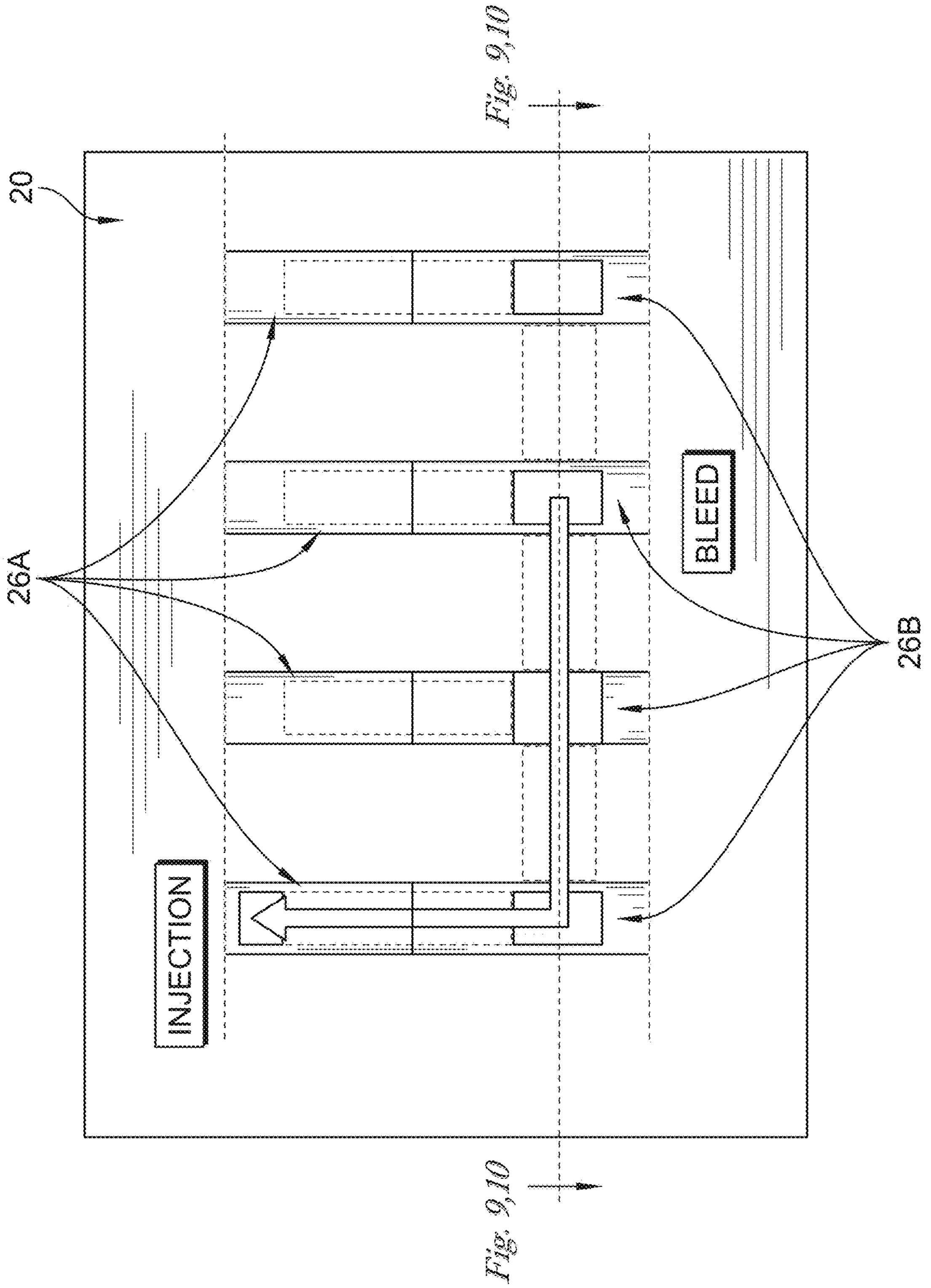
FIG. 8 is radially outward facing view of a radially inner surface of a fan case assembly.
Figure 9:
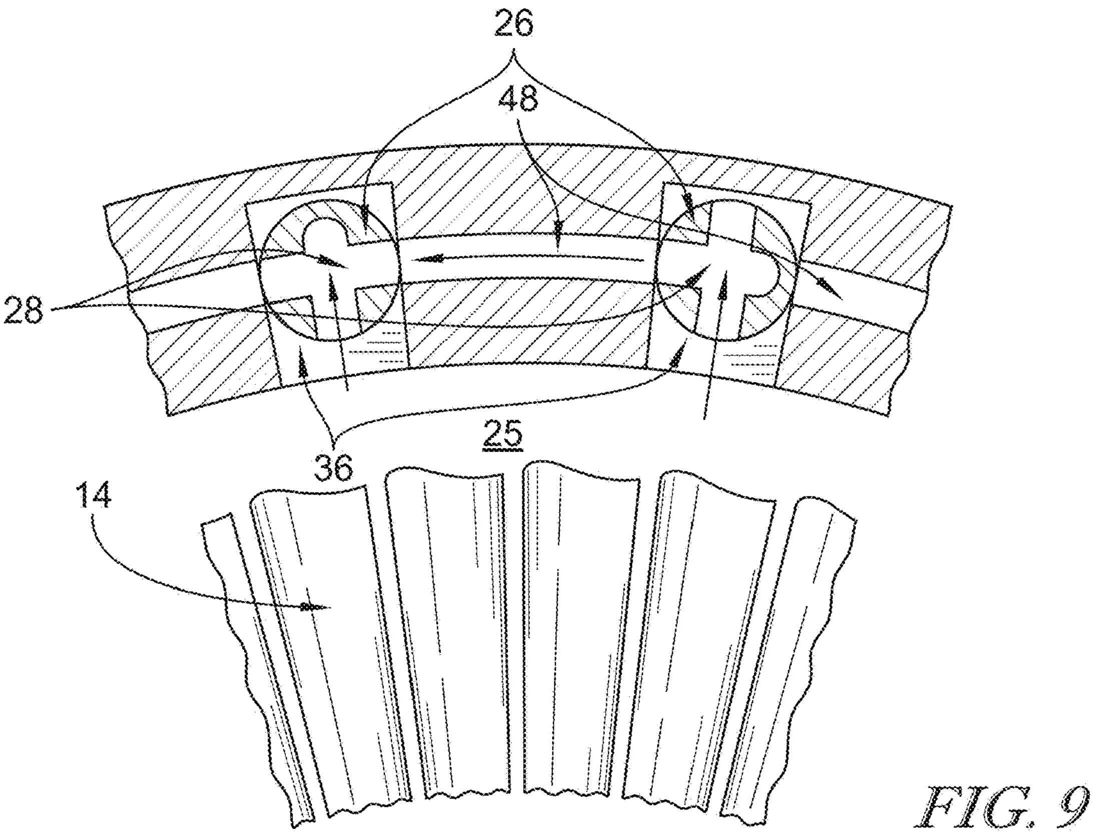
FIG. 9 is an axial cross-section view of a portion of a fan case assembly.
Figure 10:
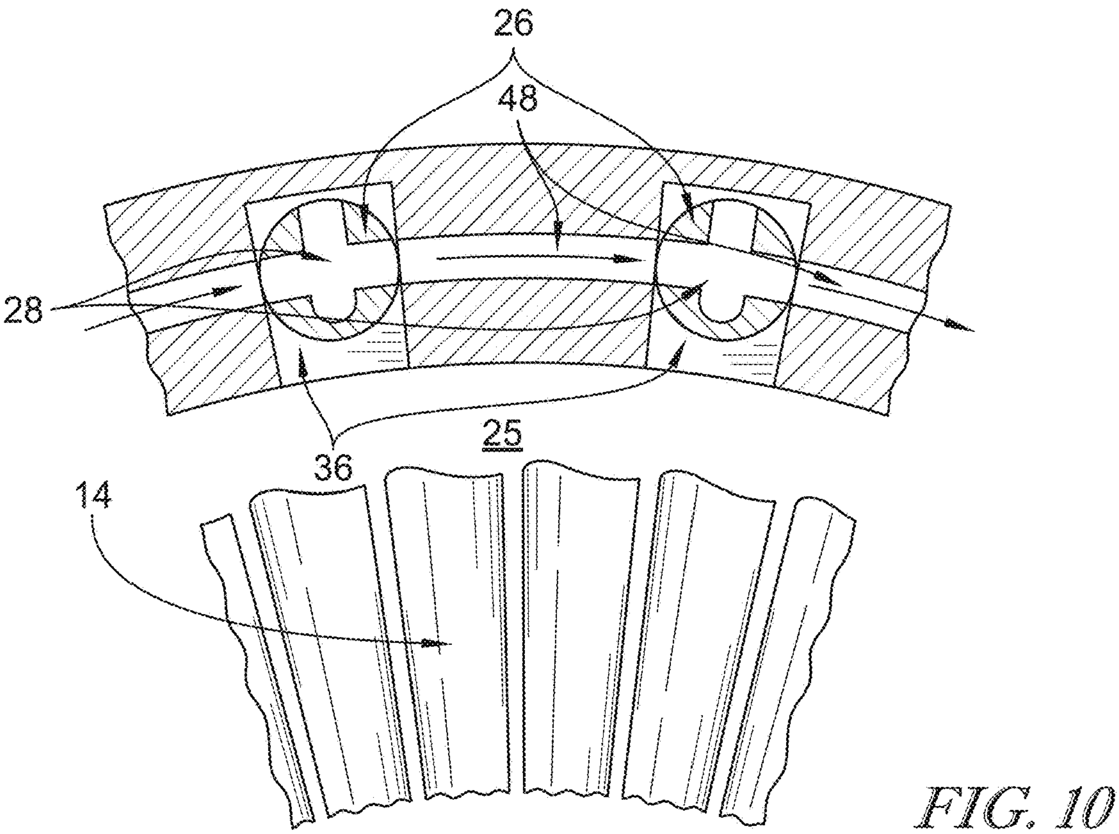
FIG. 10 is an axial cross-section view of a portion of a fan case assembly.

In some embodiments, the case 20 is formed to define a circumferential channel 48 that extends at least partway about the central axis 11, as shown in FIGS. 8-10. The plurality of grooves 36 intersect the circumferential channel 48 formed by the fan case 20.

As shown in FIGS. 2-4, the inlet distortion mitigation system 22 includes a plurality of rotatable drums 26 arranged in grooves 36 of the case 20 and a control unit 30. Each one of the plurality of drums 26 is disposed in a corresponding one of the plurality of grooves 36 formed by the fan case 20. The plurality of rotatable drums 26 are spaced circumferentially about the central axis 11 of the gas turbine engine 110. As shown in FIGS. 5A-6B, each drum 26 of the plurality of drums 26 includes a forward portion 26A and an aft portion 26B. The aft portion 26B is rotatably connected to the forward portion 26A. The forward portion 26A and aft portion 26B are each shaped to form a respective axial passageway 28A, 28B.

The forward portion 26A and the aft portion 26B of each drum 26 of the plurality of drums 26 configured to rotate about a respective drum axis between a closed position and an open position. In the closed positon, shown in FIGS. 6A and 6B, the forward portion 26A and the aft portion 26B are positioned to block fluid communication between the forward axial passageway 28A and the aft axial passageway 28B. In the open position, as shown in FIGS. 5A and 5B, the forward portion 26A and the aft portion 26B are positioned to allow fluid communication between the forward axial passageway 28A and the aft axial passageway 28B.

The system 22 and fan case assembly 10 include a control unit 30. The control unit 30 is configured to rotate the plurality of drums 26 about the respective drum axis between the closed position and the open position in response to preselected operating conditions to minimize negative effects pressure and swirl distortions in the gas turbine engine to improve stall margin. The control unit 30 includes one or more sensor 66, controller 62, memory 64, and/or actuator 60 to rotate the drums 26.

Figure 5A:
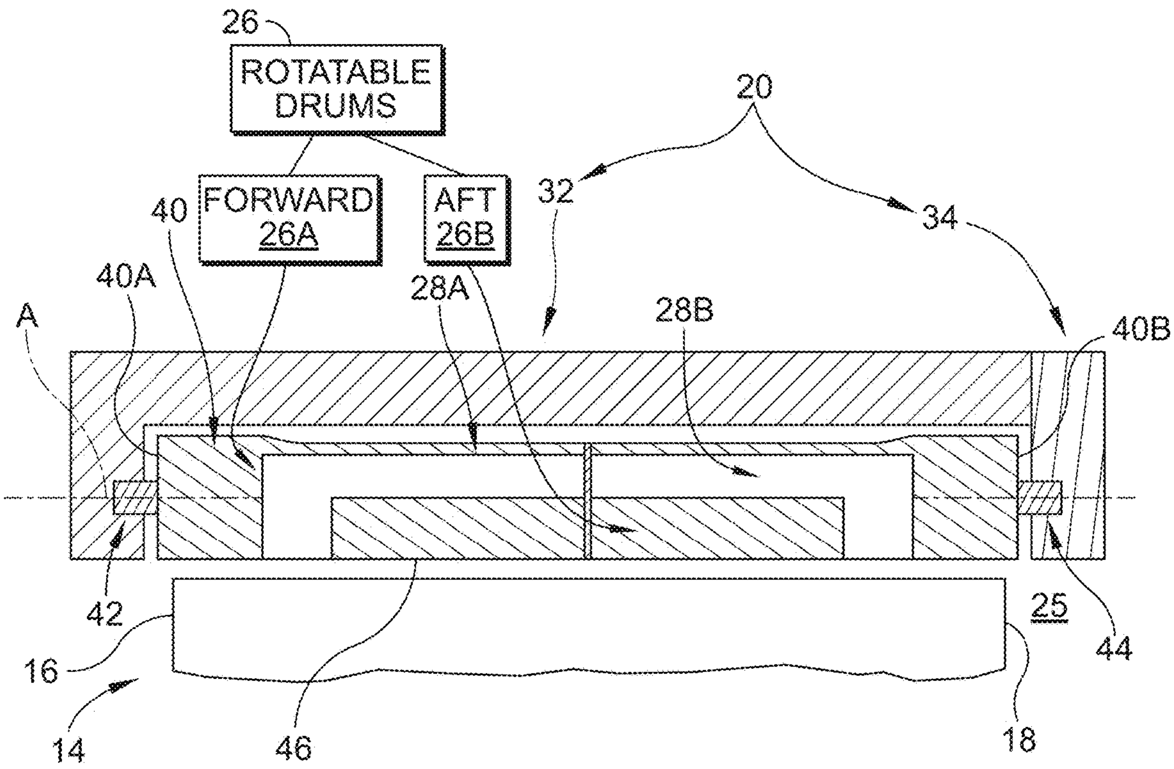
FIG. 5A is a circumferential cross-section view of an example of a drum of the fan case assembly of FIG. 3 in an open position.
Figure 5B:
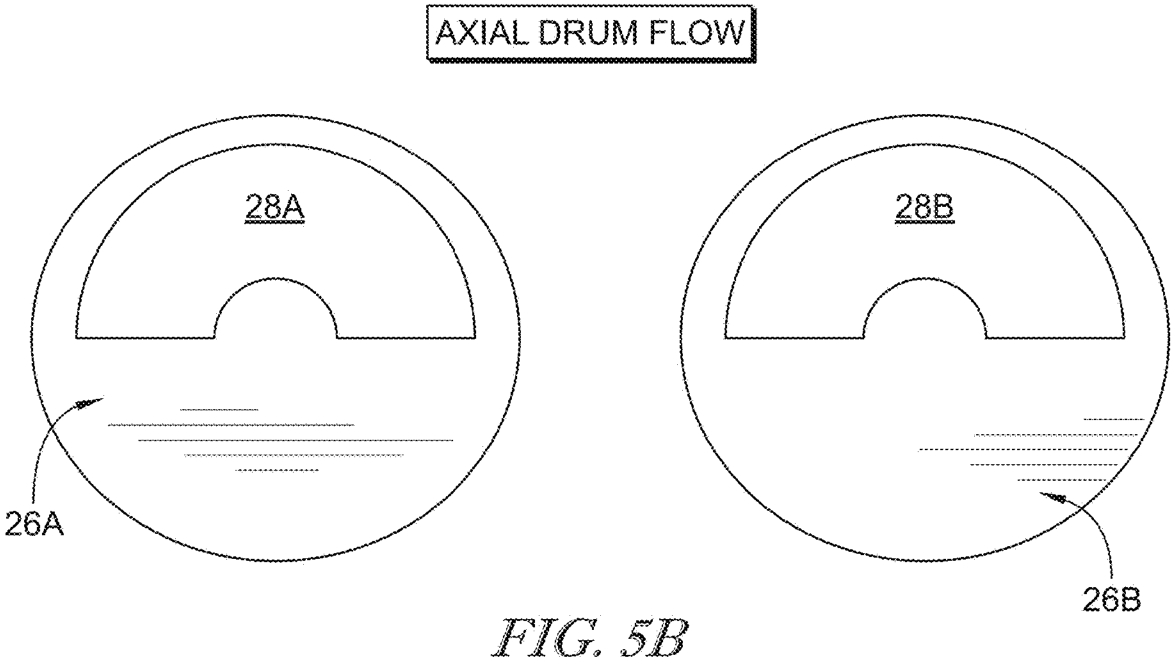
FIG. 5B is an axial cross-section view of forward and aft sections of the drum of FIG. 5A.
Figure 6A:
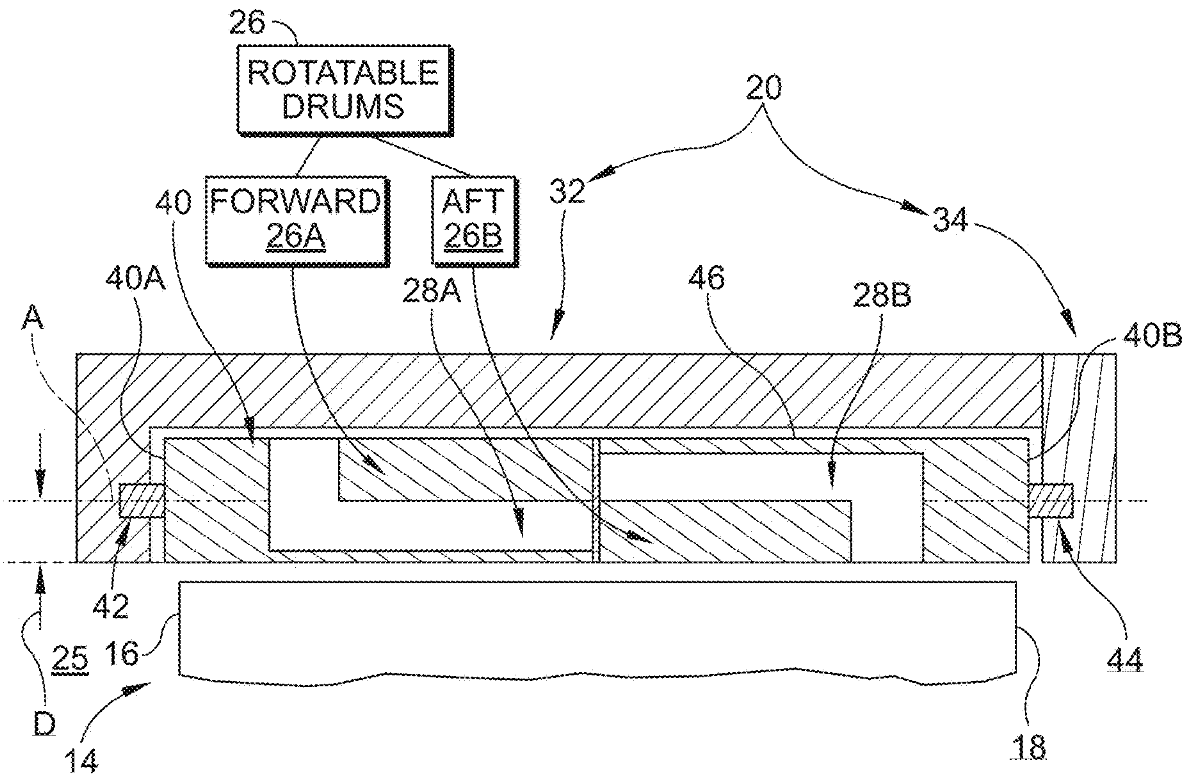
FIG. 6A is a circumferential cross-section view of an example of a drum of the fan case assembly of FIG. 3 in a closed position.

As shown in FIGS. 5A and 6A, the forward axial passageway 28A extends axially along the drum axis of the forward portion 26A from near a forward end surface of the forward portion 26A through an aft end surface of the forward portion 26A to create an aft end opening of the forward axial passageway 28A. As shown in FIGS. 5A and 6A, the aft axial passageway 28B extends axially along the drum axis of the aft portion 26B from near an aft end surface of the forward portion through a forward end surface of the aft portion 26B to create a forward end opening of the aft axial passageway 28B.

Figure 6B:
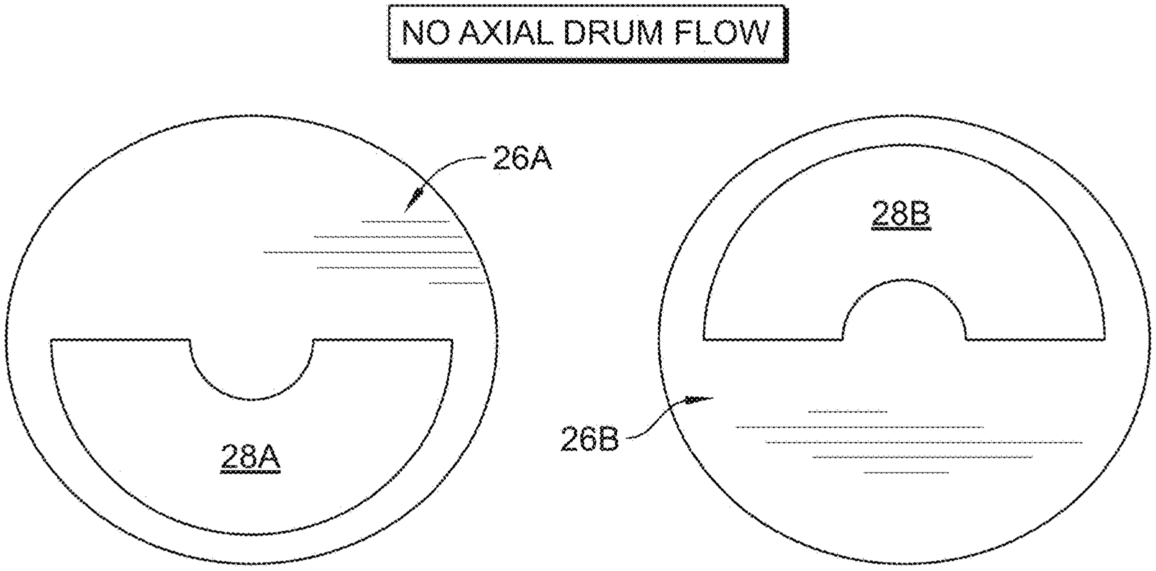
FIG. 6B is an axial cross-section view of the forward and aft sections of the drum of FIG. 6A.
Figure 11A:
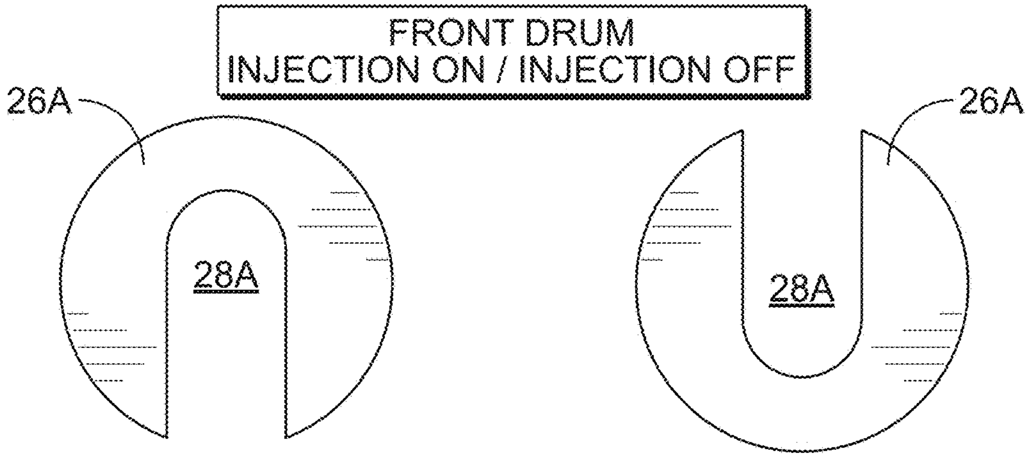
FIG. 11A is an axial cross-section view of forward section of an example of a drum in an open and closed position.

In the open position, as shown in FIGS. 5A-5B, 9, and 11B, the forward end opening of the aft axial passageway 28B and the aft end opening of the forward axial passageway 28A align to allow fluid communication between the forward axial passageway 28A and the aft axial passageway 28B. In the closed position, as shown in FIGS. 6A-6B and 11C, the forward end opening of the aft axial passageway 28B and the aft end opening of the forward axial passageway 28A are positioned to block fluid communication between the forward axial passageway 28A and the aft axial passageway 28B.

Figure 7:
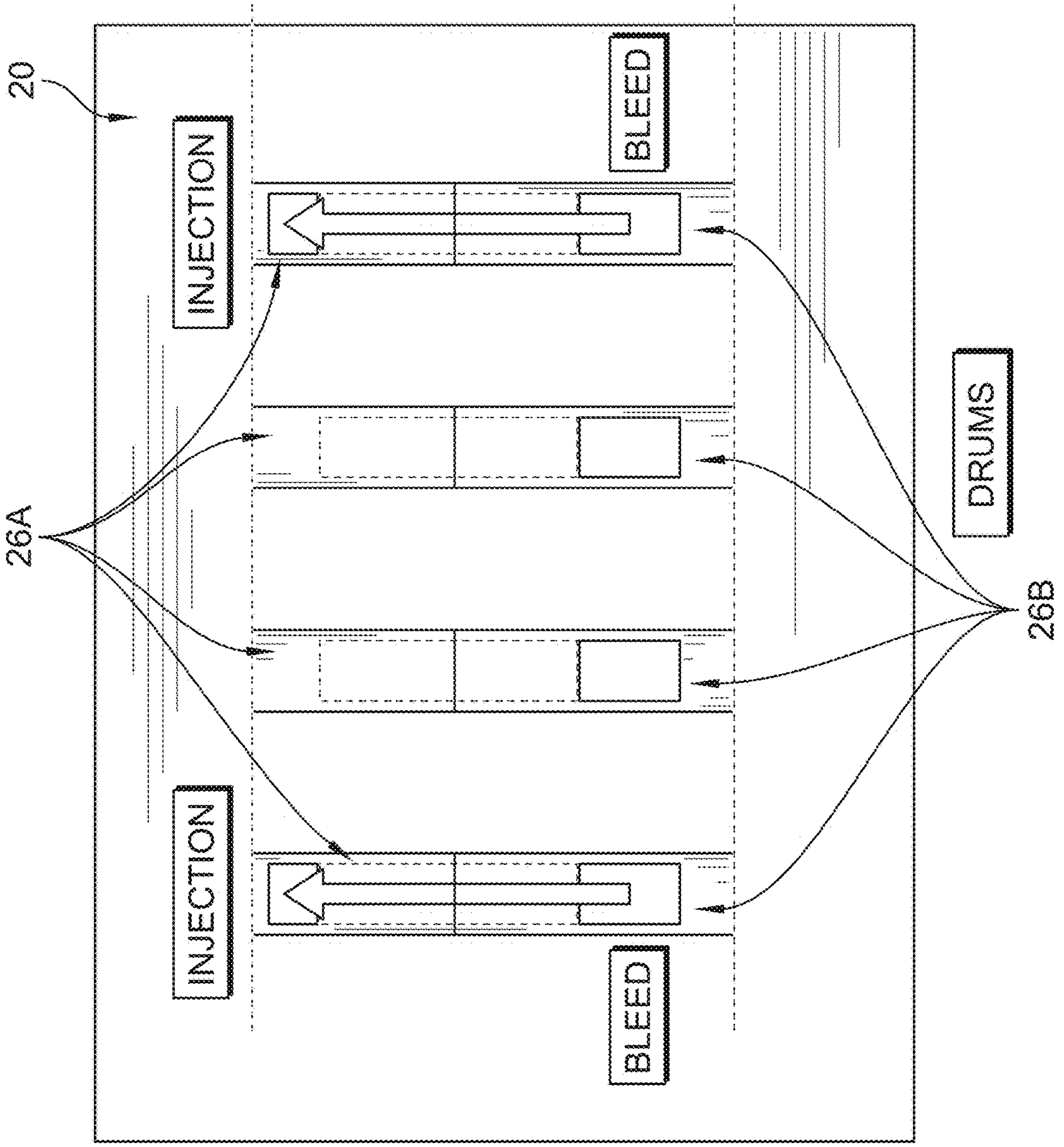
FIG. 7 is radially outward facing view of a radially inner surface of a fan case assembly.

As shown in FIGS. 5A and 6A, the forward portion 26A is shaped to form a forward aperture in an outer surface of the drum 26. The forward aperture is disposed near a forward end of the drum 26 and in fluid communication with the forward axial passageway 28A. As shown in FIGS. 5A and 6A, the aft portion 26B is shaped to form an aft aperture in an outer surface of the drum 26. The aft aperture is disposed near an aft end of the drum and in fluid communication with the aft axial passageway 28B. In the open position, as shown in FIGS. 5A-5B and on the outermost drums 26 in FIG. 7, the forward aperture and the aft aperture of a respective open drum 26 are positioned to face towards the gas path 25 to allow fluid communication between the gas path 25, the forward aperture, the forward axial passageway 28A, the aft axial passageway 28B, and the aft aperture. As shown in FIG. 7, some drums 26 of the plurality of drums 26 may be positioned to the open position (the outermost drums 26 in FIG. 7) and some drums may be positioned in the closed position (the innermost or central drums 26 in FIG. 7). Additionally or alternatively, all the drums 26 or the plurality of drums 26 may be directed to the same position.

In some embodiments, as shown in FIGS. 8-10, the case 20 further includes a circumferential channel 48, and the plurality of grooves 36 intersect the circumferential channel 48 at the aft portion 26B of the drums 26. In some embodiments, as shown in FIGS. 9 and 10, the plurality of drums 26 includes a first drum 26 in a first groove 36 and a second drum 26 in a second groove 26. A portion of the circumferential channel 48 extends between the first drum 26 and the second drum 26. In some embodiments, as shown in FIGS. 9-10 the aft portion 26B is shaped to form a T shaped passageway 28 disposed near an end of the drum in fluid communication with the respective axial passageway 28.

Figure 11B:
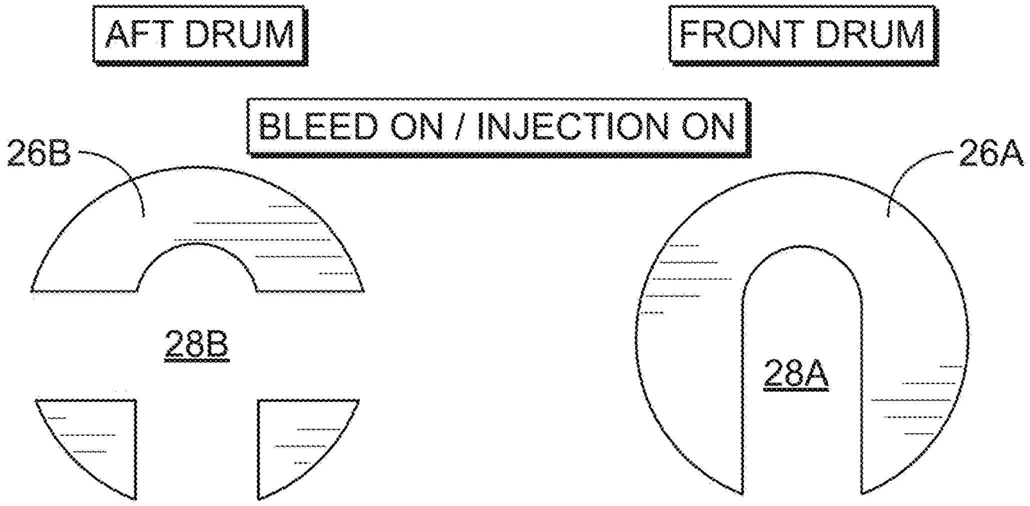
FIG. 11B is an axial cross-section view of forward and aft sections of an example of a drum in an open position.
Figure 11C:
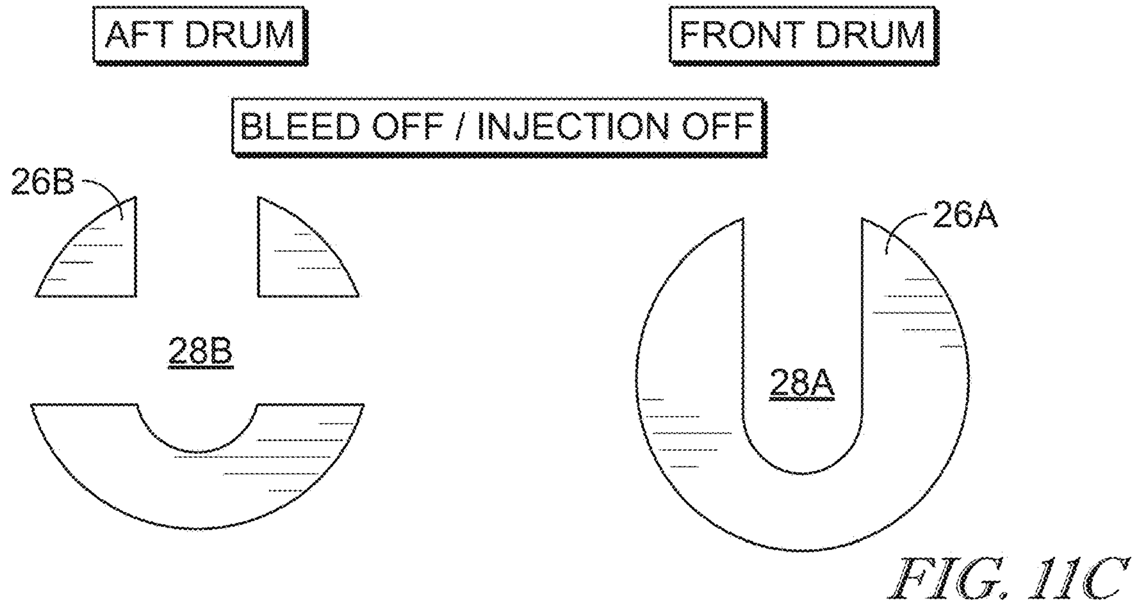
FIG. 11C is an axial cross-section view of forward and aft sections of an example of a drum in a closed position.

In some embodiments, in the open position as shown in FIGS. 9 and 11B, a first portion of the T shaped passageway 28 is aligned with the circumferential channel 48 and a second portion of the T shaped passageway 28 faces radially towards the gas path 25 to allow fluid communication between the gas path 25 and the T shaped passageway 28.

For example, the passageway 28 may be positioned to allow for both an influx of bleed air from the gas path 25 and circumferential movement of the air through the channel 48 as shown in FIG. 9. Alternatively, the passageway 28 may be positioned to allow for an influx of bleed air without allowing for circumferential movement through the channel 48, also shown in FIG. 9.

In a bypass position, as shown in FIG. 10, a first portion of the T shaped passageway is aligned with the circumferential channel 48 on both sides of the corresponding drum 26 and a second portion of the T shaped passageway 28 faces radially away from the gas path 25 to block fluid communication between the T shaped passageway 28 and the gas path 25. In some embodiments, as shown in FIG. 8, the circumferential channel 48 is disposed closer to an axially forward end of the fan case 20 or an axially aft end of the fan case 20.

The passageway 28 of the forward portion 26A of the drums 26 may be shaped as a groove 28A without portions that connect to a circumferential channel, as shown in FIG. 11. Rotation of the forward portion 26A controls whether the groove 28A is in fluid communication with the gas path 25 to inject a flow of bleed air received from the aft portion 26B into the gas path 25 through the forward portion 26A.

FIGS. 12-15 illustrate examples of different ways and/or components that may be used to drive rotation of the drums 26 and forward and aft portions 26A, 26B. FIGS. 12-15 illustrate the mechanical linkage and/or connections between the drums 26 and the driving components with the fan case 20 and other components of the assembly 10 removed for better visibility. As shown in FIGS. 12-15, each portion 26A, 26B of each drum 26 may be driven separately. Alternatively, some or all each portion 26A, 28B of the plurality of drum 26 may be driven together simultaneously by the same component. In some embodiments, the respective forward portion 26A and the aft portion 26B of a drums 26 are independently controlled.

Figure 12:
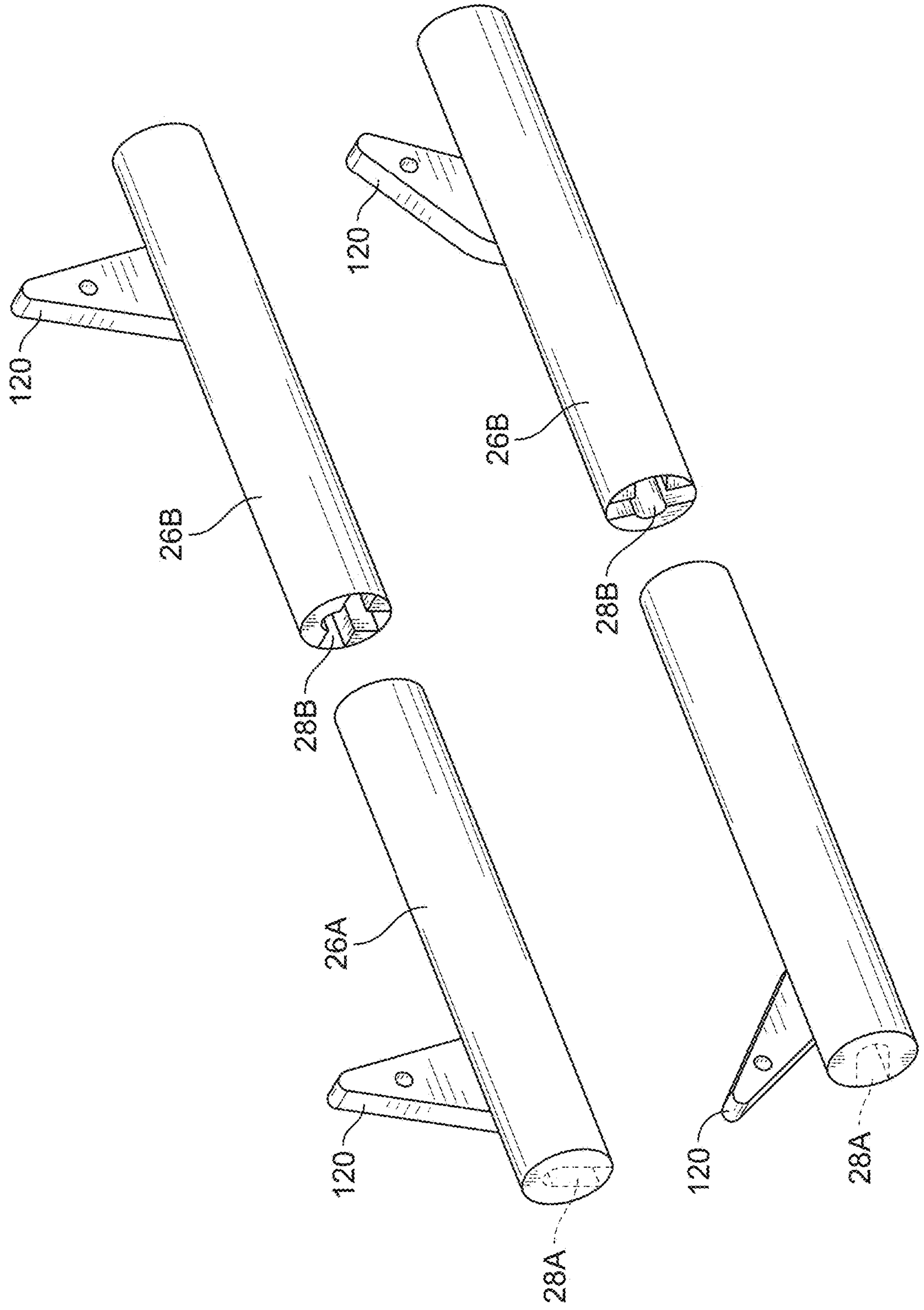
FIG. 12 is an example of drum assemblies.

In some embodiments, as shown in FIG. 12, the gas turbine engine 110 and case assembly 10 include a respective bell crank 120 disposed near each forward end and each aft end of each one of the plurality of drums 26. The bell crank 120 at the forward end is mechanically coupled with the forward portion 26A to drive rotation of the forward portion 26A. The bell crank 120 at the aft end is mechanically coupled to the aft portion 26B to drive rotation of the aft portion 26B.

Figure 13:
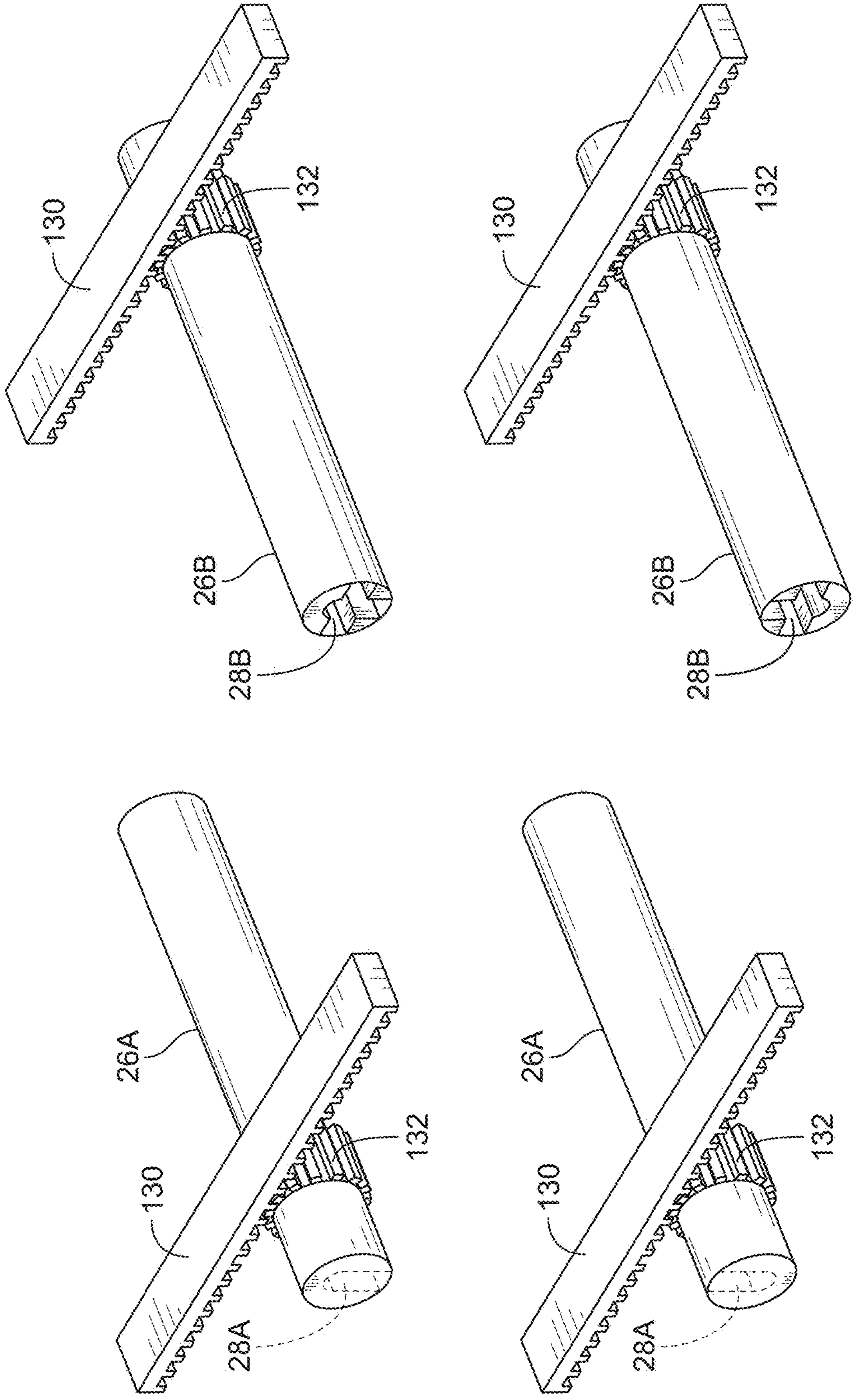
FIG. 13 is an example of drum assemblies.

In some embodiments, as shown in FIG. 13, the gas turbine engine 110 and case assembly 10 include a respective pinion 132 disposed near a forward end and an aft end of each one of the plurality of drums 26. The pinion 132 at the forward end is engaged with a rack 130 disposed on the forward portion 26A and drives rotation of the forward portion 26A. The pinion 132 at the aft end is engaged with a rack 130 disposed on the aft portion 26B and drives rotation of the aft portion 26B.

Figure 14:
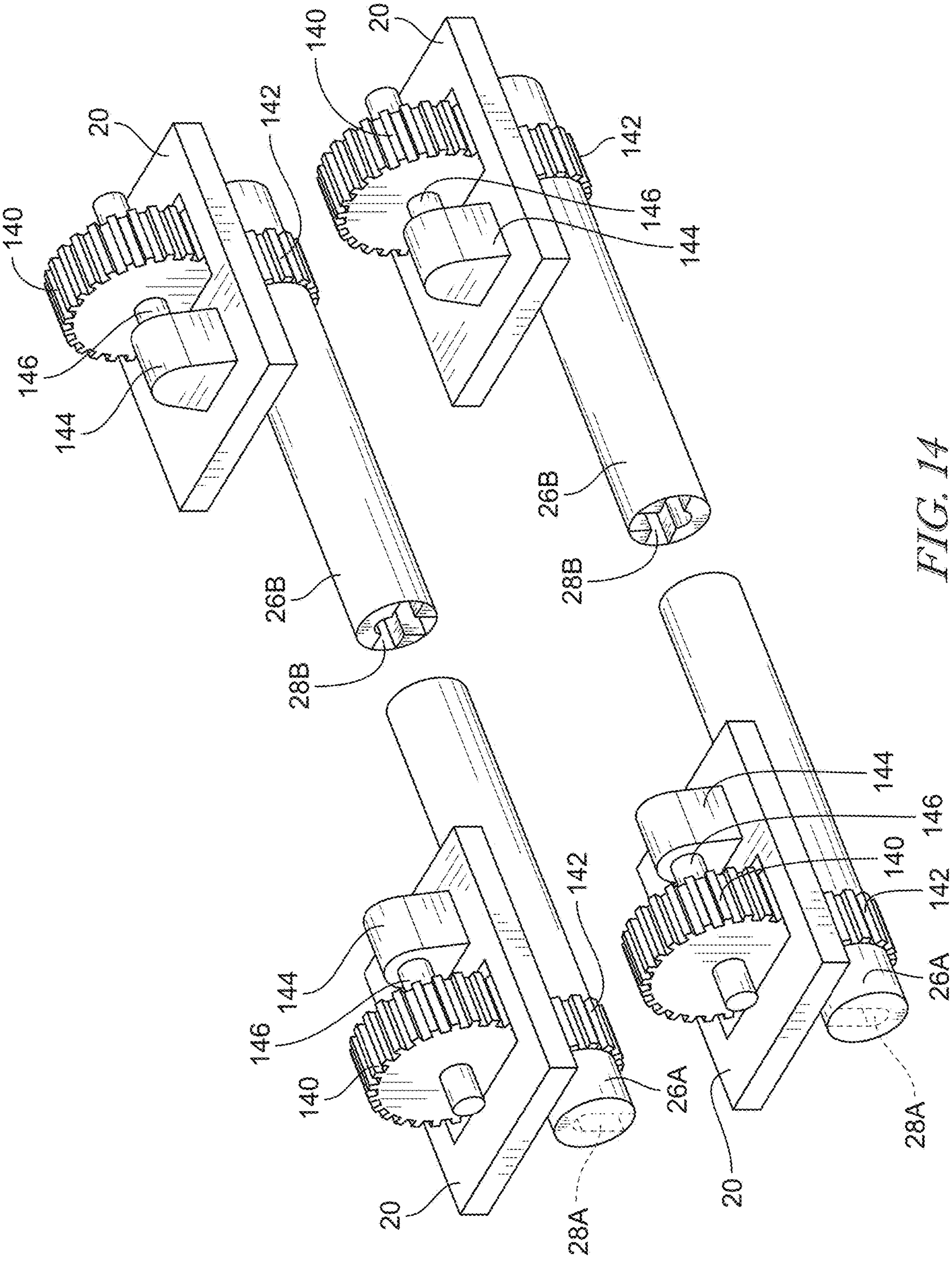
FIG. 14 is an example of drum assemblies.

In some embodiments, as shown in FIG. 14, the gas turbine engine 110 and case assembly 10 include a respective gear 140 disposed near a forward end and an aft end of each one of the plurality of drums 26. The gear 140 maybe driven by a motor 144 coupled to the gear 140 via a shaft 146 coupled to a motor 144. The gear 140 at the forward end is engaged with the forward portion 26A and drives the forward portion 26A. The gear 140 at the aft end is engaged with the aft portion 26B and drives rotation of the aft portion 26B.

Figure 15:
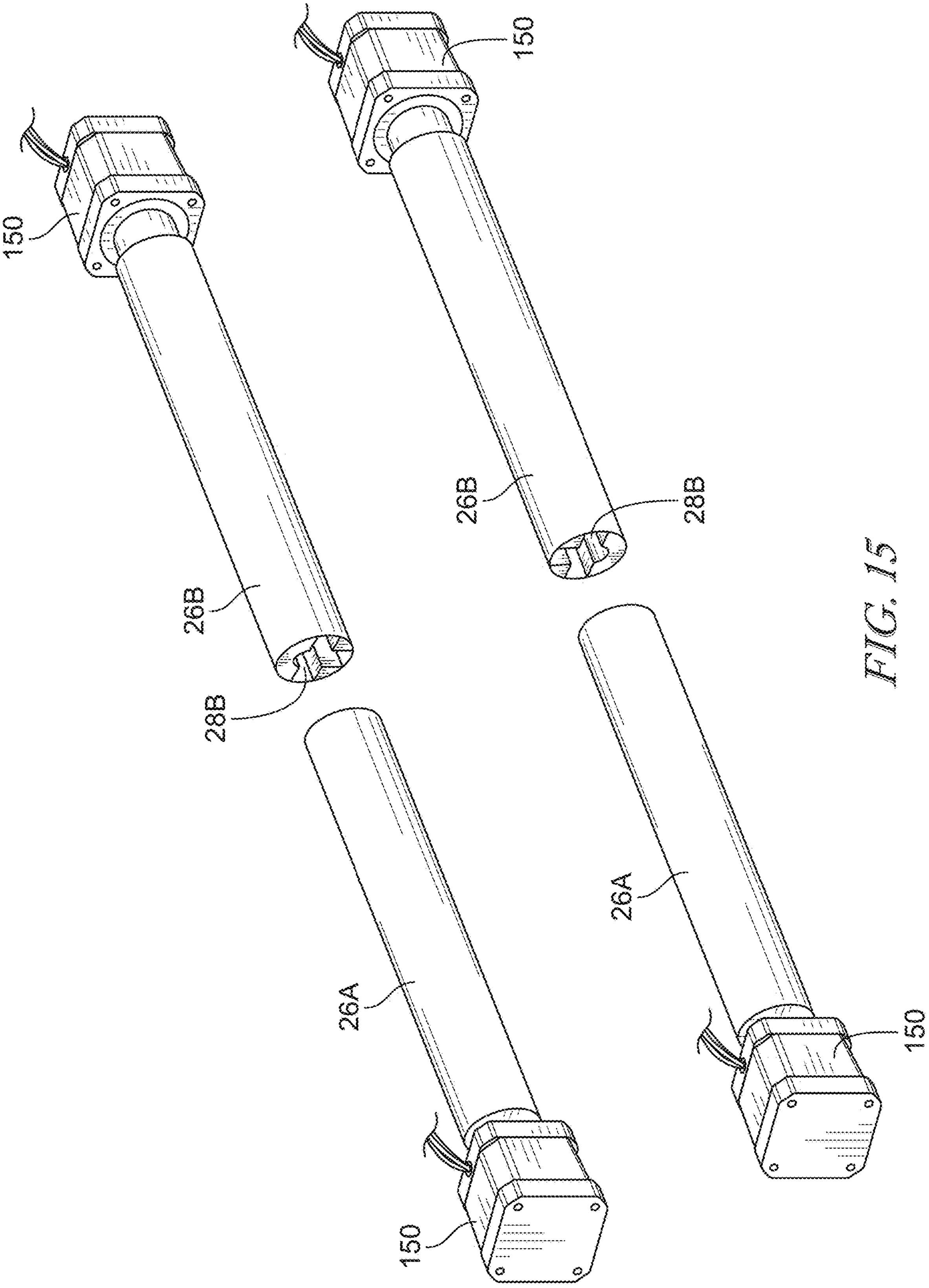
FIG. 15 is an example of drum assemblies.

In some embodiments, as shown in FIG. 15, the gas turbine engine 110 and case assembly 10 include a respective motor 150 disposed at a forward end and an aft end of each one of the plurality of drums 26. The motor 150 at the forward end is coupled to and drives rotation of the forward portion 26A. The motor 150 at the aft end 26B is coupled to and drives rotation of the aft portion 26B. Additionally or alternatively, the drums 26 could may be ganged using a belt, chain, sync ring, ring gear, and/or another suitable mechanism to drive multiple drums with 26 one drive system.

In some embodiments, a method includes providing a fan case assembly 10 adapted for use with a gas turbine engine 110. The fan case assembly including a case 20 that extends circumferentially at least partway about a central axis 11 of the gas turbine engine 110 and is formed to define an outer boundary of a gas path 25 of the gas turbine engine 110. The case formed to define a circumferential channel 48 that extends at least partway about the central axis.

A plurality of drums 26 are provided and arranged in axial grooves 36 intersecting the circumferential channel 48. Each drum of the plurality of drums 26 including a forward portion 26A and an aft portion 26B rotatably connected to the forward portion 26A. The forward portion 26A and aft portion 26B are each shaped to form a respective axial passageway 28A, 28B. Each drum 26 is configured to rotate about a respective drum axis.

In some embodiments, the method includes locating the plurality of drums 26 in a closed position in which the forward portion 26A and aft portion 26B are positioned to block fluid communication between the forward axial passageway 28A and the aft axial passageway 28B, as shown in FIGS. 6A-6B and 11C. In some embodiments, the method includes rotating the plurality of drums 26 to an open position in which the forward portion 26A and aft portion 26B are positioned to allow fluid communication between the forward axial passageway 28A and the aft axial passageway 28B, as shown in FIGS. 5A-5B and 11B.

The control unit 30 is configured to rotate the plurality of drums 26 about the respective drum axis between the closed position, the open position, and/or the bypass position. The control unit 30 is configured to rotate the drums 26 between the open positon and the closed position in response to preselected operating conditions to minimize negative effects pressure and swirl distortions in the gas turbine engine 110 to improve stall margin. The control unit 30 is configured to rotate each of the plurality of drums 26 about the corresponding drum axis A between the different positions in response to preselected operating conditions to control tip treatment of the fan blades 14.

The control unit 30 is configured to rotate each of the drums 26 to control whether the passageways 28 in each drum 26 face toward or away from the gas path 25, thereby controlling whether the passageways 28 are in fluid communication with the gas path 25 and/or the channel 48 to recirculate air at the tips of the fan blades 14. The control unit 30 controls the application of the tip treatment to the fan blades 14 so as to minimize the negative effects of pressure and swirl distortions in the gas turbine engine 110 to improve stall margin for the gas turbine engine 110.

The control unit 30 is configured to rotate the drums 26 between the different positions in response to preselected operating conditions. The preselected operating conditions include a plurality of preprogrammed aircraft maneuvers stored on a memory 64 included in the control unit 30. The plurality of preprogrammed aircraft maneuvers include banks, turns, rolls, etc.

The control unit 30 is configured to detect a preprogrammed aircraft maneuver included in the plurality of preprogrammed aircraft maneuvers on the memory 64. Once the preprogrammed aircraft maneuver is detected, the control unit 30 directs each of the drums 26 to rotate to a corresponding position in response to detecting the preprogrammed aircraft maneuver.

For example, the plurality of drums 26 may normally be in the closed position during a cruise condition so that no additional stall margin is created, but performance is not compromised. The cruise condition included in the preselected operating conditions corresponds to when the aircraft is in the cruise portion of the flight cycle.

Then, when the control unit 30 detects a preprogrammed aircraft maneuver, i.e. banks, turns, rolls, the control unit 30 directs the drums 26 to rotate to the open position so that the passageways 28 face toward the gas path 25 and flow is permitted into the passageways 28 and/or channels 48. The passageways 28 allow for air to recirculate at the tips of the fan blades 14.

Conversely, when the control unit 30 detects the cruise condition after a preprogrammed aircraft maneuver, the control unit 30 may be configured to direct the drums 26 to rotate to the closed position. Therefore, once the aircraft maneuver is completed, the drums 26 rotate to the closed position to remove the opening created in the outer boundary of the gas path 25 by the passageways 28 so that performance is not compromised and the additional stall margin is removed during the cruise condition.

The control unit 30 is configured to direct some or all of the drums 26 to rotate from the closed position to the open position based on the detected preprogrammed aircraft maneuver. Depending on the preprogrammed aircraft maneuver, the control unit 30 may direct only certain drums 26 to move to the open position, while keeping others in the closed position.

The preselected operating conditions may further include a sensor input from at least one sensor 66 included in the control unit 30. The sensor 66 is configured to measure one of pressure, air speed, altitude, blade tip timing, blade rotational speed, attitude or aircraft orientation, and acceleration. In some embodiments, the control unit 30 includes a plurality of sensors 66 each configured to measure one of pressure, air speed, altitude, blade tip timing, blade rotational speed, attitude or aircraft orientation, and acceleration.

The control unit 30 is configured to receive a measurement from the at least one sensor 66 or sensors 66 and direct the drums 26 to rotate to a corresponding position in response to the measurement of the at least one sensor 66. The control unit 30 may be configured to rotate the drums 26 to be in the closed position when the measurements from the sensor 66 are within a predetermined threshold.

Then, when the measurement from the sensor 66 is outside of the predetermined threshold, the control unit 30 directs the drums 26 to rotate to the open position. Based on the difference of the measurement from the sensor 66 compared to the predetermined threshold, the control unit 30 may vary the position of the drums 26 to control whether tip treatment is applied to the fan blades 14 of the fan 112. The control unit 30 may rotate certain drums 26 located circumferentially about the fan 112 to apply tip treatment at different areas around the fan 112. For example, the control unit 30 may direct certain drums 26 to be in the open position to open the passageways 28 of the corresponding drums 26 to the gas path 25 to allow air recirculation at that circumferential location about the fan 112.

The control unit 30 is configured to direct some or all of the drums 26 to rotate from the closed position to the open position based on the measurement from the sensor 66. As shown in FIGS. 7-8, the control unit 30 may direct some of the drums 26 to remain in the closed position and/or bypass position, while directing some of the drums 26 to rotate to the opened position based on the measurement from the sensor 66.

In some embodiments, the control unit 30 may be configured to use a combination of the sensor measurements and the detected preprogrammed aircraft maneuver to control the position of the plurality of drums 26. For example, when the control unit 30 detects a preprogrammed aircraft maneuver and the measurement is outside of the predetermined threshold, the control unit 30 directs some or all of the drums 26 to rotate to the open position. The control unit 30 is configured to individual vary the angle of the passageways 28 of each of the drums 26.

In some embodiments, the control unit 30 is configured to use the measurements from the sensor 66 to anticipate the aircraft maneuver. The control unit 30 is configured to direct some or all of the plurality of drums 26 to move to the open position in response to the measurement from the sensor 66 even though no preprogrammed aircraft maneuver is detected.

Alternatively, there may be a delay in the measurements from the sensor 66. Therefore, the control unit 30 is also configured to direct some or all of the drums 26 to move to the open position when the one of the preprogrammed aircraft maneuvers is detected, even though the measurements from the sensor 66 are within the predetermined thresholds.

In some embodiments, the control unit 30 may detect one of the preprogrammed aircraft maneuvers, but the measurements from the sensors 66 are within the predetermined threshold. If so, the control unit 30 may direct some or all of the drums 26 to remain in the current position.

In some embodiments, the inlet distortion mitigation system 22 may utilize a machine learning algorithm. The machine learning algorithm may track inputs, for example, aircraft speed, orientation, altitude, and/or fan speed versus a fan response, as well positioning of the drums 26, and learn how to move the inlet distortion mitigation system 22 to minimize stall margin loss. The mitigation system 22 may utilize the machine learning algorithm to gather data collected from the sensors 66 and/or other systems integrated with the engine 110 and evaluate the data, for example, to learn the correlation between certain environmental factors and/or inputs and stall margin. The algorithm may determine and learn how to minimize stall margin loss based on evaluation of the data collected, and be used by the system 22 to anticipate unfavorable conditions and better control the drums 26 to mitigate stall margin loss.

Embedded and boundary layer ingestion (BLI) applications may introduce severe distortion in the form of pressure gradients and swirl. A fan, for example, a fan of a gas turbine engine, must survive going through different sectors of their circumference with varying level of pressure or swirl magnitudes, which may be difficult to manage for stall or aeromechanical behavior. Flow distortions induced by different crosswind and flight orientation profiles may generate different flow distortions radially and circumferentially.

In some embodiments, the drums 26 are incorporated with a variable rotating array of drums 26 that may be rotated, as a whole or in smaller groupings, or turned individually to expose the fan tips to the grooves 36 and/or channel 48 via the drums 26. In some embodiments, the drums 26 connect circumferentially to channels 48, making the design relatively more compact and thus can fit in a small airframe better. The drum 26 changes between closed, transferring between flowpath 25 and channel 48, and transferring only between the channels 48 to either side of the drum 26 (not open to flowpath). This may allow for targeted transfer of flows from where there is excess flow and/or pressure to reduced flow and/or pressure. There may remain trades between efficiency and stall margin but in a more compact package potentially.

In some embodiments, the rotating drums 26 are incorporated into the fan case 20 or into liners and may be operated via a variable geometry system similar to variable vanes. It may be easiest to have the variable geometry system perpendicular to the drum 26 rotation axis, but it would also be possible to lay the drums in at an angle and actuate via small bevel gears at the drum 26 ends or similar. This may help offset the flows in the case 20.

In some embodiments, the drums 26 and system 22 permits the fan 112 to operate with the drums 26 limited to retain some efficiency, but then open to the channel 48 when stall margin improvement is desired. The passageways 28 may be located as necessary to treat forward or aft sections of the case 20. The passageways 28 may be be shaped to promote desired flow in both conditions.

In some embodiments, as the aircraft maneuvers and inlet flow distortion variations are generated, the drum 26 array may be rotated to provide either improved stall margin or closed to channels 48 to provide best efficiency. This may be beneficial to eliminate a troublesome trade between stall margin and performance potentially, or the system would be able to handle more extreme inlet distortion during maneuvering. In some embodiments, the channels 48 between drums 26 include options to go circumferential or axial and circumferential, the system 22 could be used for a tip injection like flow or a hoop plenum type flow solution.

In some embodiments, the system 22 design trades treated area for radial space, for example, by having fewer openings to the flowpath 25 but also being capable to be radially shorter than the design with a plenum outboard of the drums 26. It takes time for stall to develop so this may be acceptable trade. The drums 26 may be open to flowpath 25 and turn the flow to be tangential and flow in a passageway 28 or channel 48 within the liner/casing 20 space, and then would be turned again to be transferred back into the flowpath 25, as seen in FIG. 9.

In some embodiments, it may be possible to include an additional pathway in the drum to permit pass-through without it being open to flowpath 25, which would allow for flows to bypass an opening and transfer to another circumferential location, as seen in FIGS. 8 and 10. When transferring from or to the flowpath 25 and communicating with the channel 48, the additional pathway in the drums 26 is blocked by the drum interface closed top or outer extent. The air flows from flowpath 25, through the channel 48, and then into flowpath 25 at another location. The channel 48 to either side of this circuit are closed off. In some embodiments, if the local area is neither much higher than average nor much lower than average pressure, the local openings may be closed off (drums 26 not open to flowpath 25) but may still transfer flows around the case using the drum design. This design may provide benefits in being able to control the flows as needed, as well as provide opportunity to integrate into a tip injection layout. One of the challenges of active tip injection is how to extract flows but also be able to turn it off as desired. This design provides a means to control tip injection flows largely within the fan case liners by turning the drums 26.

In some embodiments, while a radially outboard plenum may allow for transfers into and out of it by turning of the drums and relies on self-regulation of the flows (high pressure areas flow in, low pressure areas see flows from it), the design as seen in FIGS. 1-11 may allow for more controlled flows by switching on drums and having passages between specific sectors. It may be relatively more complex but provide more active control. The system 22 design may be used for distortion tolerance in fans. Additionally or alternatively, the design may also be used in a booster or high pressure compressor and thus reduced radial space (vs. a radial plenum) would be even more vital for those applications.

The drum 26 design provides a way to control the flows as needed, as well as provide opportunity to integrate into a tip injection layout. One of the challenges of active tip injection is how to extract flows but also be able to turn it off as desired. The drums 26 design provides a means to control tip injection flows largely within the fan case liners by turning the drums In some embodiments, the two drum portions 26A, 26B (divided axially) are connected so that flows may transfer between them. The drums portions 26A, 26B may rotate independently to communicate flow tangentially at one axial location between neighboring drums and then also transfer axially, then tangentially and axially to another drum. Alternatively, the flow may be shared tangentially fully at one axial location and then the drum 26 aligned appropriately forward and aft to flow axially. In some embodiments, the drums 26 may be driven or rotated by different means, which may include but not limited to stepper motors at the ends, bell crank, rack and pinion, gears through the case. It may be less than 180 degree coverage for some options.

Depending on system needs, the offset may be an extent of challenging distortion or the length it takes for stall to fully develop between areas. The drum 26 would turn to open from areas of higher pressure and treat areas forward of it with lower pressure or flow. While the drums 26 may be able to transfer flows axially forward within themselves, having channels 48 within the liner or casing traveling axially and circumferentially may be beneficial. If an area's aft portion has high pressure then its forward portion may also be high (even accounting for swirling flow). Therefore, there may also need to be circumferential relocation of the transfer flows.

What is claimed is:

1. A fan case assembly adapted for use with a gas turbine engine, the fan case assembly comprising a case that extends circumferentially at least partway about a central axis of the fan case assembly to define an outer boundary of a gas path of the gas turbine engine, a plurality of grooves that extend axially at least partway between an axially forward end of the fan case and an axially aft end of the fan case, a plurality of drums, each one of the plurality of drums disposed in a corresponding one of the plurality of grooves of the fan case and spaced circumferentially about the central axis, each drum of the plurality of drums including a forward portion and an aft portion rotatably connected to the forward portion, the forward portion and aft portion each shaped to form a respective axial passageway, the forward portion and the aft portion of each drum of the plurality of drums configured to rotate about a respective drum axis between a closed position in which the forward portion and the aft portion are positioned to block fluid communication between the forward axial passageway and the aft axial passageway, and an open position in which the forward portion and the aft portion are positioned to allow fluid communication between the forward axial passageway and the aft axial passageway, and a control unit configured to rotate the plurality of drums about the respective drum axis between the closed position and the open position in response to preselected operating conditions to minimize negative effects pressure and swirl distortions in the gas turbine engine to improve stall margin.

2. The fan case assembly of claim 1, wherein the forward axial passageway extends axially along the drum axis of the forward portion from near a forward end surface of the forward portion through an aft end surface of the forward portion to create an aft end opening of the forward axial passageway.

3. The fan case assembly of claim 2, wherein the aft axial passageway extends axially along the drum axis of the aft portion from near an aft end surface of the forward portion through a forward end surface of the aft portion to create a forward end opening of the aft axial passageway.

4. The fan case assembly of claim 3, wherein in the open position, the forward end opening of the aft axial passageway and the aft end opening of the forward axial passageway align to allow fluid communication between the forward axial passageway and the aft axial passageway.

5. The fan case assembly of claim 3, wherein in the closed position, the forward end opening of the aft axial passageway and the aft end opening of the forward axial passageway are positioned to block fluid communication between the forward axial passageway and the aft axial passageway.

6. The fan case assembly of claim 1, wherein the forward portion is shaped to form a forward aperture in an outer surface of the drum, the forward aperture disposed near a forward end of the drum and in fluid communication with the forward axial passageway.

7. The fan case assembly of claim 6, wherein the aft portion is shaped to form an aft aperture in an outer surface of the drum, the aft aperture disposed near an aft end of the drum and in fluid communication with the aft axial passageway.

8. The fan case assembly of claim 7, wherein in the open position, each of the plurality of drums is positioned to face the forward aperture and the aft aperture towards the gas path to allow fluid communication between the gas path, the forward aperture, the forward axial passageway, the aft axial passageway, and the aft aperture.

9. The fan case assembly of claim 1, wherein the case further includes a circumferential channel, the plurality of grooves intersecting the circumferential channel.

10. The fan case assembly of claim 9, wherein the plurality of drums includes a first drum in a first groove and a second drum in a second groove, a portion of the circumferential channel extending between the first drum and the second drum.

11. The fan case assembly of claim 10, wherein at least one of the forward portion and the aft portion is shaped to form a T shaped passageway disposed near an end of the drum in fluid communication with the respective axial passageway.

12. The fan case assembly of claim 11, wherein in the open position, a first portion of the T shaped passageway is aligned with the circumferential channel and a second portion of the T shaped passageway faces radially towards the gas path to allow fluid communication between the gas path and the T shaped passageway.

13. The fan case assembly of claim 11, wherein in a bypass position, a first portion of the T shaped passageway is aligned with the circumferential channel on both sides of the corresponding drum and a second portion of the T shaped passageway faces radially away from the gas path to block fluid communication between the T shaped passageway and the gas path.

14. A gas turbine engine comprising a fan including a fan rotor configured to rotate about an axis of the gas turbine engine and a plurality of fan blades coupled to the fan rotor for rotation therewith and a fan case assembly adapted for use with the gas turbine engine, the fan case assembly comprising a case that extends circumferentially at least partway about a central axis of the fan case assembly to define an outer boundary of a gas path of the gas turbine engine, a plurality of grooves that extend axially at least partway between an axially forward end of the fan case and an axially aft end of the fan case, a plurality of drums, each one of the plurality of drums disposed in a corresponding one of the plurality of grooves of the fan case and spaced circumferentially about the central axis, each drum of the plurality of drums including a forward portion and an aft portion rotatably connected to the forward portion, the forward portion and aft portion each shaped to form a respective axial passageway, the forward portion and the aft portion of each drum of the plurality of drums configured to rotate about a respective drum axis between a closed position in which the forward portion and aft portion are positioned to block fluid communication between the forward axial passageway and the aft axial passageway, and an open position in which the forward portion and aft portion are positioned to allow fluid communication between the forward axial passageway and the aft axial passageway, and a control unit configured to rotate the plurality of drums about the respective drum axis between the closed position and the open position in response to preselected operating conditions to minimize negative effects pressure and swirl distortions in the gas turbine engine to improve stall margin.

15. The gas turbine engine of claim 14 further comprising a respective bell crank disposed near a forward end and an aft end of each one of the plurality of drums, the bell crank at the forward end mechanically coupled with the forward portion and the bell crank at the aft end mechanically coupled to the aft portion.

16. The gas turbine engine of claim 14 further comprising a respective pinion disposed near a forward end and an aft end of each one of the plurality of drums, the pinion at the forward end engaged with a rack disposed on the forward portion and the pinion at the aft end engaged with a rack disposed on the aft portion.

17. The gas turbine engine of claim 14 further comprising a respective gear disposed near a forward end and an aft end of each one of the plurality of drums, the gear at the forward end engaged with the forward portion and the gear at the aft end engaged with the aft portion, wherein a respective motor is coupled to each one of the gears.

18. The gas turbine engine of claim 14 further comprising a respective motor disposed at a forward end and an aft end of each one of the plurality of drums, the motor at the forward end configured to rotate the forward portion and the motor at the aft end configured to rotate the aft portion.

19. The gas turbine engine of claim 14 wherein the respective forward portion and the aft portion are independently controlled.

20. A method comprising providing a fan case assembly adapted for use with a gas turbine engine, the fan case assembly including a case that extends circumferentially at least partway about a central axis of the gas turbine engine and formed to define an outer boundary of a gas path of the gas turbine engine, the case formed to define a circumferential channel that extends at least partway about the central axis and a plurality of drums arranged in axial grooves intersecting the circumferential channel, each drum of the plurality of drums including a forward portion and an aft portion rotatably connected to the forward portion, the forward portion and aft portion each shaped to form a respective axial passageway, each drum of the plurality of drums configured to rotate about a respective drum axis, locating the plurality of drums in a closed position in which the forward portion and aft portion are positioned to block fluid communication between the forward axial passageway and the aft axial passageway, and rotating the plurality of drums to an open position in which the forward portion and aft portion are positioned to allow fluid communication between the forward axial passageway and the aft axial passageway.

* * * * *